United States Patent
Cha

(10) Patent No.: US 12,223,558 B2
(45) Date of Patent: Feb. 11, 2025

(54) SYSTEM FOR MANAGING CHECK-IN AND COLLECTING ENVIRONMENTAL INFORMATION AT ACCOMMODATIONS, AND METHOD THEREFOR

(71) Applicant: Hiun Cha, Seoul (KR)

(72) Inventor: Hiun Cha, Seoul (KR)

( * ) Notice: Subject to any disclaimer, the term of this patent is extended or adjusted under 35 U.S.C. 154(b) by 59 days.

(21) Appl. No.: 17/938,964

(22) Filed: Sep. 7, 2022

(65) Prior Publication Data

US 2022/0414804 A1  Dec. 29, 2022

Related U.S. Application Data

(63) Continuation of application No. PCT/KR2020/006475, filed on May 18, 2020.

(51) Int. Cl.
| | |
|---|---|
| *G06Q 50/12* | (2012.01) |
| *G06Q 10/02* | (2012.01) |
| *H04W 4/02* | (2018.01) |
| *H04W 4/029* | (2018.01) |

(52) U.S. Cl.
CPC ............ *G06Q 50/12* (2013.01); *G06Q 10/02* (2013.01); *H04W 4/023* (2013.01); *H04W 4/029* (2018.02)

(58) Field of Classification Search
CPC ....... G06Q 50/12; G06Q 10/02; H04W 4/029; H04W 4/023
See application file for complete search history.

(56) References Cited

U.S. PATENT DOCUMENTS

| | | | | |
|---|---|---|---|---|
| 9,811,785 | B1* | 11/2017 | Bion | G06T 11/206 |
| 10,111,277 | B2* | 10/2018 | Deros | H04W 4/021 |
| 2018/0350170 | A1* | 12/2018 | Wang | G06F 1/3231 |
| 2018/0357576 | A1* | 12/2018 | Rachitsky | G06Q 10/02 |
| 2019/0311044 | A1* | 10/2019 | Xu | G06N 5/01 |
| 2019/0392695 | A1* | 12/2019 | Schulz | G08B 23/00 |

FOREIGN PATENT DOCUMENTS

| | | |
|---|---|---|
| KR | 10-2014-0106089 A | 9/2014 |
| KR | 10-1652505 B1 | 8/2016 |
| KR | 10-2016-0140347 A | 12/2016 |
| KR | 10-2019-0130243 A | 11/2019 |
| KR | 10-2116872 B1 | 5/2020 |

OTHER PUBLICATIONS

Ji-hye, Jun, "Air quality monitor becomes everyday household item," The Korea Times, Seoul, Sep. 19, 2018.*
International Search Report for PCT/KR2020/006475 mailed Feb. 15, 2021 from Korean Intellectual Property Office.

* cited by examiner

*Primary Examiner* — Nathan Erb
(74) *Attorney, Agent, or Firm* — Revolution IP, PLLC

(57) ABSTRACT

A system for managing check-in and collecting environmental information at accommodations, includes: an accommodations management server for managing room reservations and the check-in authorities of guests; and a room device which acquires identification information about a smart device to transmit same to the accommodations management server if a user's smart device is recognized, and which operates in a first mode or a second mode according to the authority information received from the accommodations management server.

6 Claims, 3 Drawing Sheets

[FIG. 1]
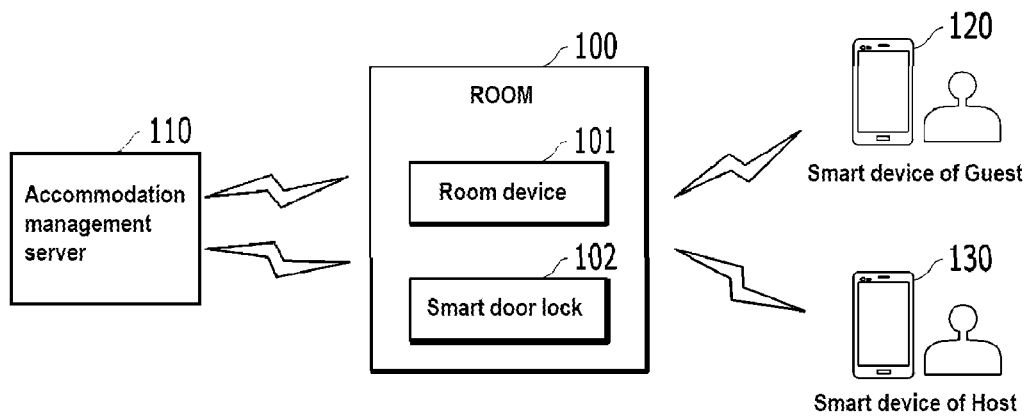
[FIG. 2]
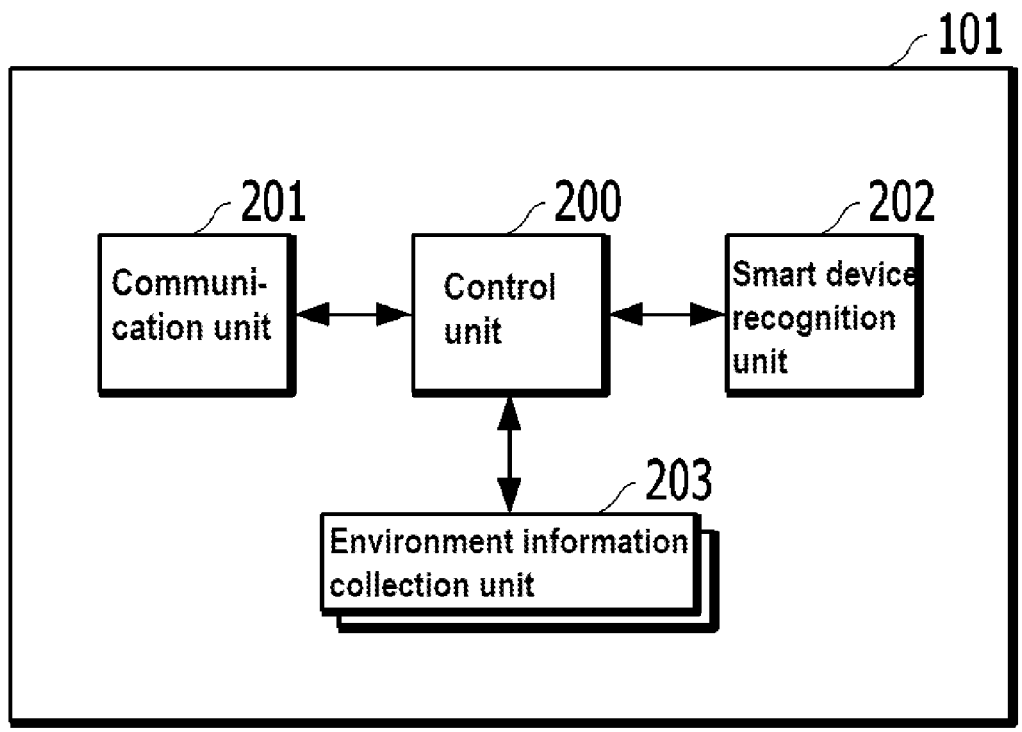

[FIG. 3]
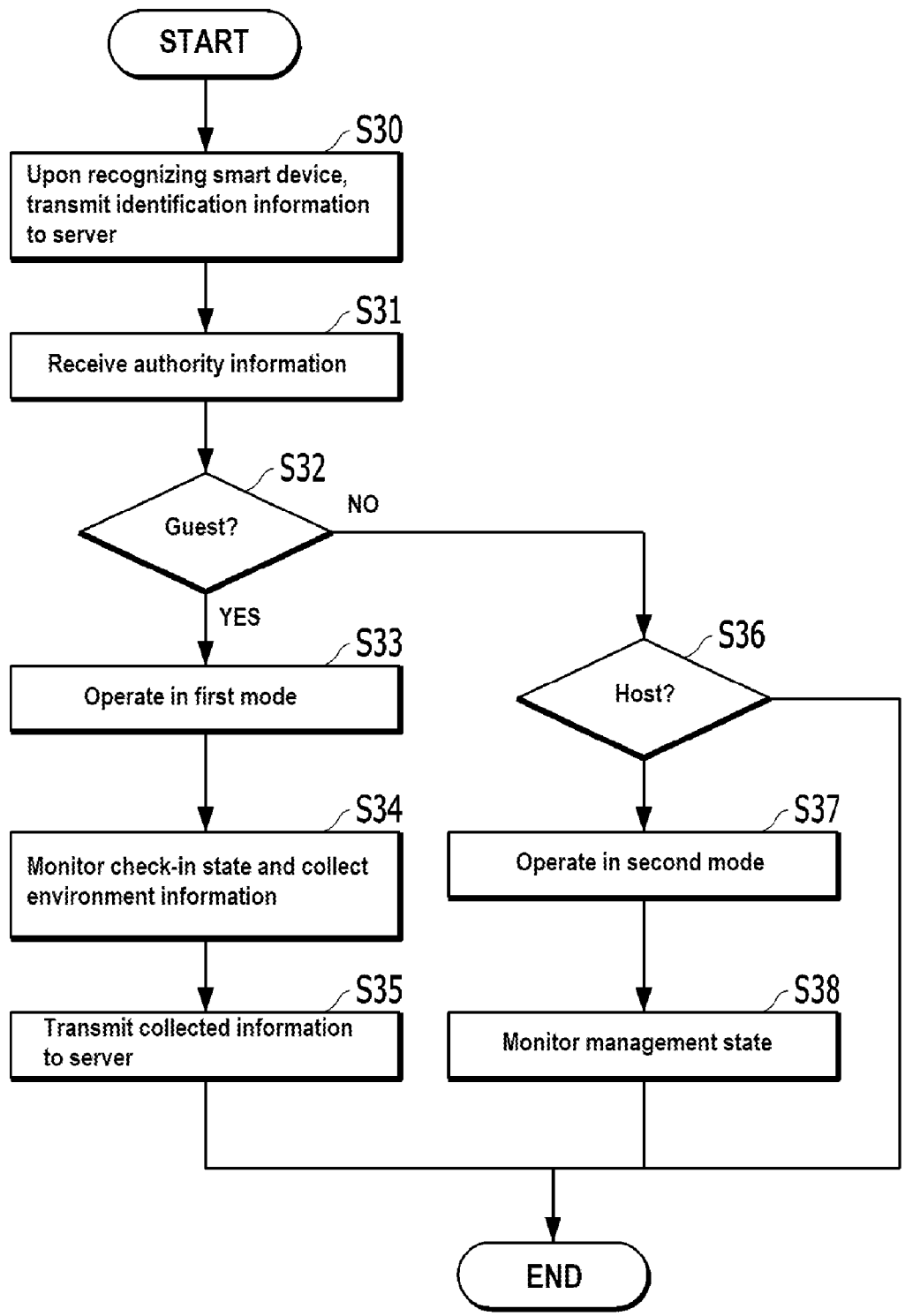

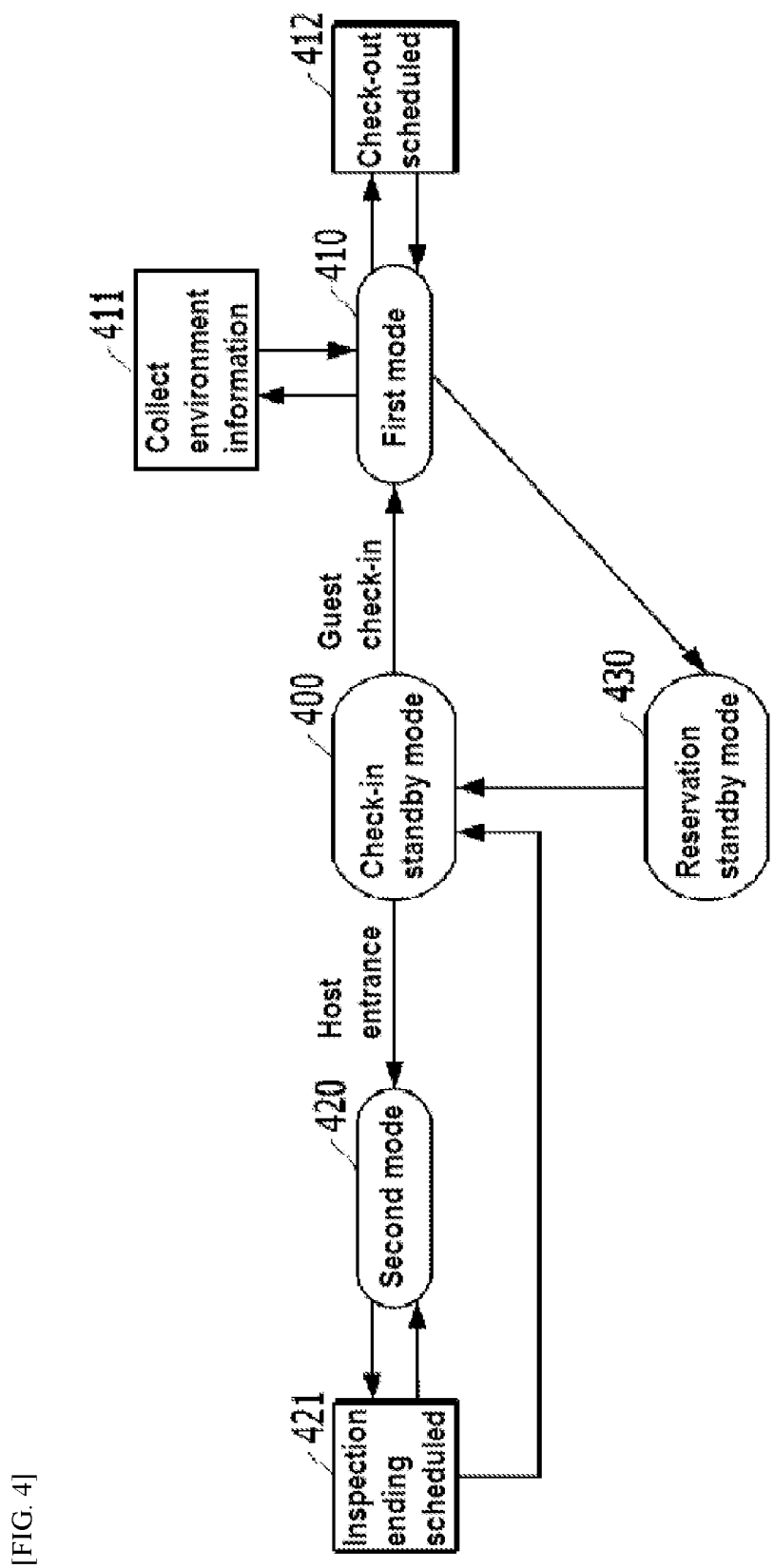
[FIG. 4]

SYSTEM FOR MANAGING CHECK-IN AND COLLECTING ENVIRONMENTAL INFORMATION AT ACCOMMODATIONS, AND METHOD THEREFOR

TECHNICAL FIELD

The present invention relates to an accommodation service, and more specifically, to a system and method for automatically managing check-in of a shared accommodation, and collecting environment information inside of a room to provide a user with the environment information.

BACKGROUND ART

The use of shared accommodation services, such as Air Bed and Breakfast (Airbnb), is increasing. A shared accommodation service is a service that mediates between a host who desires rental and a traveler who desires lodging, and from a traveler's perspective, has the benefits of providing lodging at an affordable price and allowing them to experience local life, while from a host's perspective, it has the benefit of offering a separate profit from its use as a side job.

Unlike hotels, which are the existing accommodations for providing standardized services, it is difficult to ensure room conditions, heating and cooling conditions, indoor air quality, and the like in shared accommodation services. This is because the service quality of a room provided through a shared accommodation service may be identified only when guests directly ask the host or check reviews left by others, but information and reputations about the house that are identified from the information provided by the host or the reviews on the Internet are less objective and accurate.

Even in the existing accommodations, such as hotels, whether a room is equipped with an air conditioner, a heating device, a humidifier, an air purifier, and the like may be identified in advance at the time of reservation, but a customer who is planning to make a reservation cannot identify in advance whether such devices operate properly while a guest is staying in the room, whether cooling or heating is working well, or the actual indoor environment, such as the temperature or humidity of a room without an air conditioning device or a heating device in a season when cooling or heating is not required.

Meanwhile, fine dust concentrations are increasing worldwide; in some cities, the concentrations exceed a level that threatens human health. Fine dust concentrations outside of buildings are identifiable because measurement data from specialized institutions is open to the public, but there is no method of identifying the air pollution level inside a building, particularly the fine dust concentration inside a room of an accommodation in which a customer desires to stay.

Accordingly, there is neither a method for travelers with a respiratory disease such as asthma or who are sensitive to polluted air to select a clean indoor space, nor a method of selecting at least an accommodation with clean indoor air on an unavoidable business trip or vacation to an area with a high fine dust concentration. In addition, apart from outdoor air pollution, it is impossible to identify in advance whether the indoor air is polluted by pollutants generated from indoor interior materials, bedding, equipment, and the like.

In addition, unlike hotels with concierge services, in check-in or check-out provided in shared accommodation services, the host providing the room individually makes an appointment with the guest to meet the guest and hand over a key, or hides the key in a pre-arranged place. This causes great inconvenience and hassle to travelers. A reservation guest may not identify whether a room is currently available for check-in without directly asking the host, and the host also may not identify whether the guest has checked in without contacting the guest.

DISCLOSURE

Technical Problem

In order to solve the problems of the conventional technology described above, the present invention provides a system for managing check-in and collecting environment information of an accommodation that is capable of automatically collecting indoor environment information while a guest is actually staying in a room of an accommodation and providing the indoor environment information to a customer who desires to make a reservation.

In addition, the present invention provides a system for managing check-in and collecting environment information of an accommodation that is capable of automatically identifying whether a guest has checked in and an inspection task status of a host even in a shared accommodation in which a manager is not resident, thereby satisfying both a reservation customer and a host.

Technical Problem

In order to achieve the above object, a system for managing check-in and collecting environment information of an accommodation according to an embodiment of the present invention includes: an accommodation management server configured to manage a room reservation and check-in authority of a guest; and a room device configured to, upon recognizing a smart device of a user, acquire identification information of the smart device, transmit the acquired identification information to the accommodation management server, and operate in a first mode or a second mode according to authority information received from the accommodation management server, wherein the room device is configured to, in response to the user being a guest having authority to check in to a corresponding room, operate in the first mode of tracking a location of the guest to monitor a check-in state of the room and collecting environment information inside of the corresponding room to transmit the collected environment information to the accommodation management server, and in response to the user being a host of a corresponding room, operate in the second mode of tracking a location of the host to monitor a management state of the corresponding room and, upon determining that a management task is completed, notifying the accommodation management server that the corresponding room is available for check-in, and wherein the accommodation management server configures a room reservation page using environment information of the room and whether the room is available for check-in.

The accommodation management server may provide the smart device of the user, which has selected the corresponding room, with environment information including at least one piece of information among temperature information, humidity information, fine dust information, noise information, and chemical pollutant information collected with respect to the corresponding room while the room device is operating in the first mode.

The accommodation management server may acquire external environment information including at least one piece of information among temperature information, humidity information, fine dust information, noise information, and chemical pollutant information of a region in which the room is located, and provide the acquired external environment information to the smart device of the user through a reservation page of the corresponding room.

The system for managing check-in and collecting environment information of a shared accommodation may further include a smart door lock configured to control opening or closing of a door of the room, wherein the accommodation management server may, when the identification information of the smart device transmitted from the room device corresponds to a guest having check-in authority, transmit a signal instructing to set a temporary password to the smart door lock of the room, and transmit a message informing the temporary password to the smart device of the guest.

The system for managing check-in and collecting environment information of a shared accommodation may further include a smart door lock configured to control opening or closing of a door of the room, wherein the accommodation management server may, when the identification information of the smart device transmitted from the room device corresponds to a guest having check-in authority, transmit a door open signal to the smart door lock of the room.

The room device may be configured to, in response to a smart device of the guest not being recognized for a predetermined time between points in time before and after a scheduled check-out time of the guest or longer, switch to a scheduled check-out state, and in response to the smart device of the guest not being recognized for a predetermined time or longer after the switching to the scheduled check-out state, switch to a check-out state and stop collecting the environment information.

The room device may be configured to, in response to a smart device of the host being recognized in the check-out state of the guest, switch to a scheduled management task end state, and in response to the smart device of the host not being recognized for a predetermined time after the switching to the scheduled management task end state, determine that the management task is completed and transmit a message indicating that the room is available for check-in to the accommodation management server.

The room device may include an emergency button, and may be configured to, in response to the emergency button operating, notify the accommodation management server that the emergency button has operated, and the accommodation management server may be configured to transmit a message indicating that the emergency button has operated to the host of the room.

A room device according to an embodiment of the present invention includes: a smart device recognition unit provided with a beacon to recognize a smart device approaching within a predetermined distance; a communication unit including a network module to communicate with the accommodation management server; an environment information collecting unit including at least one sensor for measuring at least one piece of information among temperature information, humidity information, fine dust information, noise information, and chemical pollutant information of a room and a region thereof; and a controller configured to, in response to a smart device of a user being recognized by the smart device recognition unit, acquire identification information of the smart device and transmit the acquired identification information to the accommodation management server, and in response to the user being a guest having authority to check in to a corresponding room, operate in a first mode of tracking a location of the guest to monitor a check-in state of the corresponding room and transmitting the environment information collected through the environment information collecting unit to the accommodation management server, and in response to the user being a host of the room, operate in a second mode of tracking a location of the host to monitor a management state of the corresponding room and, upon determining that a management task is completed, notifying the accommodation management server that the corresponding room is available for check-in.

A method of managing check-in and collecting environment information of an accommodation according to an embodiment of the present invention includes: upon recognizing, by a room device, a smart device of a user, acquiring identification information of the smart device, and transmitting the acquired identification information to an accommodation management server; receiving authority information of the user from the accommodation management server; operating in a first mode in response to the user being a guest having authority to check in to a corresponding room, and operating in a second mode in response to the user being a host of the corresponding room according to the authority information; in the first mode, tracking location information of the guest to monitor a check-in state of the corresponding room and collecting environment information inside of the corresponding room while the guest is checked in state to transmit the collected environment information to the accommodation management server; and in the second mode, tracking location information of the host to monitor a management state of the corresponding room and, upon determining that a management task is completed, notifying the accommodation management server that the corresponding room is available for check-in.

Advantageous Effects

According to the present invention, through a room device provided with a sensor capable of acquiring various types of environment information, such as a temperature, a humidity, and a fine dust level inside an accommodation, environment information inside of a room is automatically collected while a guest is checked in, and the environment information is provided on a room reservation page, so that customers can select satisfactory rooms.

In addition, according to the present invention, a device provided with a beacon is installed in a room of an accommodation such that check-in/check-out processes are managed to be automatically processed when a guest enters/leaves the room, so that guests and hosts can conveniently use and provide the accommodation service.

DESCRIPTION OF DRAWINGS

FIG. 1 is a diagram for describing a network configuration of a system for managing check-in and collecting environment information of an accommodation according to an embodiment of the present invention.

FIG. 2 is a block diagram for describing a configuration of a room device according to an embodiment of the present invention.

FIG. 3 is a flowchart for describing a method of managing check-in and collecting environment information of an accommodation according to an embodiment of the present invention.

FIG. 4 is a diagram for describing conversion between operating modes of a room device according to an embodiment of the present invention.

BEST MODE OF THE INVENTION

Terms used herein will be briefly described and exemplary embodiments will be described in detail.

Although the terms used herein are selected from among general terms that are currently and widely used in consideration of functions in exemplary embodiments, these may be changed according to intentions or customs of those skilled in the art or the advent of new technology. In addition, in a specific case, some terms may be arbitrarily selected by applicants. In this case, meanings thereof will be described in a corresponding description of exemplary embodiments. Therefore, the meanings of terms used herein should be interpreted based on substantial meanings of the terms and content of this entire specification, rather than simply the terms themselves.

Throughout the specification, the term "comprises" or "includes" and/or "comprising" or "including" does not mean that one or more other components are excluded unless context dictates otherwise. In the specification, the term "part" or "module" refers to a unit for processing at least one function or operation that may be implemented in hardware, software, or a combination thereof.

Although embodiments of the present disclosure will be described in detail with reference to the accompanying drawings in order to enable those skilled in the art to easily practice the disclosure, the present disclosure may be embodied in many different forms and should not be construed as being limited to the embodiments set forth herein. In the drawings, parts irrelevant to the description have been omitted for clarity of explanation, and the same reference numerals are used to designate the same elements through the specification.

FIG. 1 is a diagram for describing a network configuration of a system for managing check-in and collecting environment information of an accommodation according to an embodiment of the present invention.

Referring to FIG. 1, a system for managing check-in and collecting environment information of an accommodation includes a room device 101 installed inside a room 100 of an accommodation, an accommodation management server 110 configured to perform functions required for accommodation services, such as room information collection and provision, room reservation, guest management, check-in management, host management, and the like, a smart device 120 of a guest, and a smart device 130 used by a host of a corresponding room.

A host is a user who is the owner or operator of a room and is set as a person having management authority when the room is registered in the accommodation management server 110. A guest is a user who reserves and uses a room registered by a host.

The accommodation management server 110 is a computing system having software and/or hardware components based on a web server or in a type of dedicated application for providing a room reservation service and a room management service for a host of each room. The accommodation management server 110 manages a room reservation and check-in authority of a guest, and to this end, stores various types of information for services, such as information about lists of accommodations and rooms, reservation information of each room, information about hosts responsible for managing accommodations or rooms, information about guests, environment information of a region in which each accommodation is located, indoor environment information of each room, and the like, and updates the various types of information.

The smart devices 120 and 130 are terminal devices of users who desire to use a room reservation service or a room management service through a dedicated application or homepage, and may be preferably implemented as a mobile device, such as a smart phone, capable of communicating with the room device 101 and the accommodation management server 110. However, the smart devices 120 and 130 are not limited thereto, and may be provided using other computing devices, such as personal computers, personal digital assistants (PDAs), and portable computers.

A user may identify environment information, such as recent temperature, humidity, fine dust, noise, chemical pollutants, and the like, of a room on a reservation page provided by the accommodation management server 110 and select and reserve a desired room. When reserving a room, the accommodation management server 110 receives identification information from a dedicated application installed on the smart device 120 of a reservation guest, and the identification information is used to identify a user who has the smart device 120. The accommodation management server 110 may process past indoor environment information collected for a room into environment information for each season, month, or/and time, and provide a user with the processed environment information through a reservation page. In addition, the accommodation management server 110 may also provide a result of comparing the environment information with environment information of the corresponding region.

The accommodation management server 110 receives information, such as the location, area, and the like, of each room, through the smart devices 130 of hosts who have contracted to share rooms thereof and manages the information, and when a room is registered, receives identification information from a dedicated application installed on the smart device 130 of the host. The identification information of the smart device 130 of the host is used to identify a user possessing the corresponding smart device 130. In addition, the accommodation management server 110 also stores identification information (e.g., identification information of a beacon installed in a room) of the room device 101 installed in each room, and manages the stored identification information, and the identification information is used to identify the room.

The accommodation management server 110 grants a guest, who has reserved a predetermined room, authority to access the room from an available check-in time to a scheduled check-out time. In addition, the accommodation management server 110 grants a host authority to access a room when the room is in a check-in standby mode after a guest checks out or is in a reservation standby mode without a reservation guest. This is because the room requires inspection and management, such as cleaning, and even the host, who is the owner of the room though, is not granted access authority while a guest is checked in.

The room device 101 may recognize a smart device with a dedicated application according to the present invention approaching the room device 101 within a predetermined range, and to this end, may have a communication device, such as a beacon. A beacon is a short-range wireless communication device based on a Bluetooth 4.0 (BLE) protocol, and is a smartphone short-range communication technology that enables message transmission and mobile payment by finding a user's location within a radius of 50 m to 70 m. The beacon having a longer usable range than near field communication (NFC) is suitable for O2O services connecting online and offline. The beacon operating at low power has low battery consumption in smartphones, and performs more precise indoor positioning compared to a GPS.

The room device 101, upon recognizing a smart device of a user, acquires identification information of the smart device and transmits the identification information to the accommodation management server 110. The accommodation management server 110 determines whether the smart device having the transmitted identification information is the smart device 130 of the host, who has the management authority of the corresponding room, or the smart device 120 of the guest, who has been given the authority to check in to the corresponding room by reserving the corresponding room, and generates authority information describing a result of the determination and transmits the authority information to the room device 101.

The room device 101 operates in a first mode or a second mode according to the authority information received from the accommodation management server 110. That is, the room device 101 operates in different modes depending on the user approaching the room device 101. The room device 101, in response to the approaching user being a guest having the authority to check in to the corresponding room, switches to the first mode and operates, and in response to the approaching user being a host having the authority to access the corresponding room, switches to the second mode and operates.

When operating in the first mode, the room device 101 tracks the location of the guest to monitor a check-in state of the corresponding room, collects environment information in the corresponding room, and transmits the collected environment information to the accommodation management server 110. The accommodation management server 110 having received the indoor environment information stores the environment information of the corresponding room, and uses the environment information later when configuring a reservation page for the corresponding room.

When operating in the second mode, the room device 101 tracks the location of the host to monitor a management state of the corresponding room, and upon determining that an inspection and management task is completed, notifies the accommodation management server 110 that the corresponding room is available for check-in. The inspection and management task is a preparation task for receiving guests, such as cleaning of the room, and the management state may indicate whether cleaning is in progress or completed. The accommodation management server 110 having been notified of whether check-in is possible may configure a reservation page for the corresponding room and receive a reservation.

The accommodation management server 110 may provide a list of rooms that are available for check-in through a dedicated application installed in the smart device 120 of the user or a web page, and may configure a reservation page including basic information (a location, a price, an area, a configuration, etc.) for a room selected by a user and environment information received from the room device 101 in the past.

The accommodation management server 110 provides the smart device 120 of the user who has selected the corresponding room with environment information including at least one piece of information among temperature information, humidity information, fine dust information, noise information, and chemical pollutant information collected for the corresponding room while the room device 101 is operating in the first mode. The accommodation management server 110 may acquire external environment information including at least one piece of information among temperature information, humidity information, fine dust information, noise information, and chemical pollutant information of a region in which the room is located, and may provide the smart device of the user with the acquired external environment information through a reservation page of the corresponding room. The user may compare and identify the information and reserve a room with a desired condition. On the other hand, when operating in the second mode, the check-in standby mode, and the reservation standby mode, the room device 101 does not preferably measure the indoor environment information. In other words, unlike hotels, the existing shared accommodations providing standardized services, it is difficult to ensure environment information of room conditions, air conditioning and heating conditions, indoor air quality, etc. in the shared accommodation service, so the room device 101 is not provided to measure and provide indoor environment information in the second mode, the check-in standby mode, and the reservation standby mode, in which the room is not used by guests. Accordingly, the room device 101 may provide only the environment information collected in the first mode, in which a guest is checked in, thereby providing substantial indoor environment information for when a guest stays directly in the shared accommodation.

The system for managing check-in and collecting environment information of a shared accommodation may further include a smart door lock 102 installed on a door of a room. The smart door lock 102 is a locking device for controlling the opening or closing of the door of the room, and receives a control signal from the room device 101, the accommodation management server 110, or the smart device 120 of the guest having check-in authority, and opens or locks the door of the room according to the control signal. When the guest is checked out, the smart door lock 102 may receive a control signal from the smart device 130 of the host and open or lock the door of the room according to the control signal.

The accommodation management server 110 may, when the identification information of the smart device transmitted from the room device 101 corresponds to a guest having check-in authority, that is, in a case where a guest who has made a reservation on the corresponding date approaches, transmit a signal instructing to set a temporary password to the smart door lock 102 of the room, and transmit a message informing of the temporary password to the smart device 120 of the guest.

The accommodation management server 110 may, when the identification information of the smart device transmitted from the room device 101 corresponds to a guest having check-in authority, transmit a door open signal to the smart door lock 102 of the room such that the locking device of the door of the room is automatically released.

FIG. 2 is a block diagram for describing a configuration of a room device according to an embodiment of the present invention.

Referring to FIG. 2, the room device 101 installed in each room of the accommodation is a computing device including a control unit 200, a communication unit 201, a smart device recognition unit 202, and an environment information collection unit 203.

The control unit 200 manages an operation mode of the device 101, a lodging state of a guest, and a management state of a host, and controls other components. The communication unit 201 includes a network module for communication with the accommodation management server 110 and transmits and receives various types of information required for management of the accommodation according to the control of the control unit 200. The smart device recognition unit 202 recognizes a smart device of a user approaching within a predetermined radius, and may include a short-range wireless communication device, such as a beacon. The environment information collection unit 203 may include one or more sensors capable of measuring at least one piece of information among temperature information, humidity information, fine dust information, noise information, and chemical pollutant information inside of the room, and according to the control of the control unit 200, measure environment information of items that are set every predetermined period of time while a guest is checked in, and return a result value of the measurement to the control unit 200. In addition, in the second mode, the check-in standby mode, and the reservation standby mode, when a guest is not checked in, the environment information collection unit 203 is not provided to operate the one or more sensors for measuring indoor environment information. That is, a case in which ventilation is not performed or air conditioning/heating equipment is not operated because there is no guest in the room is excluded from the environment information, thereby preventing inaccurate environment information from being provided to the user.

When a user approaches a room while carrying the smart device 120 with a dedicated application installed, the beacon of the smart device recognition unit 202 automatically detects the smart device 120 and performs communication to thereby recognize the approach of the smart device 120 and acquire identification information of the smart device 120.

The control unit 200, upon recognizing, by the smart device recognition unit 202, the smart device of the user, transmits the acquired identification information of the smart device to the accommodation management server 110. The accommodation management server 110 uses the identification information to determine whether the user is a guest who has the authority to stay in the room at the corresponding time or a host who is visiting for inspection of the corresponding room, and uses a result of the determination to generate authority information and transmits the generated authority information to the room device 101.

The control unit 200, in response to the user being a guest who has the authority to check-in to the corresponding room, performs control for operation in the first mode. In the first mode, the control unit 200 uses the smart device recognition unit 202 to track location information of the guest to monitor a check-in state of the corresponding room, and transmits environment information periodically collected through the environment information collection unit to the accommodation management server 110.

The control unit 20, when a guest having check-in authority approaches a room in a check-in standby mode, notifies the accommodation management server 110 of the approach, and the accommodation management server 110 transmits an open signal to the smart door lock 102 of the corresponding room such that the door may be automatically opened.

The control unit 200 receives staying period information including a scheduled check-in date and time and a scheduled check-out date and time of the corresponding guest from the accommodation management server 110 and stores the received staying period information. The control unit 200, in response to the smart device 120 of the guest not being recognized for a predetermined time between points in time before and after the scheduled check-out time of the guest or longer, switches to a scheduled check-out state, and in response to the smart device 120 of the guest not being recognized for another predetermined time or longer after the scheduled check-out state, switches to a check-out state and performs control to stop collecting the environment information. In addition, the control unit 200 transmits a message indicating that the guest has checked out of the room to the accommodation management server 110.

The control unit 200, in response to the user being a host of the corresponding room, performs control for operation in the second mode. In the second mode, the control unit 200 uses the smart device recognition unit 202 to track location information of the host to monitor a management state of the corresponding room. The control unit 200, upon determining that an inspection and management task of the host is completed, provides the accommodation management server 110 with information indicating that the corresponding room is available for check-in.

The room device 101 may further include an emergency button. In a case in which the emergency button is pressed by a guest in an emergency and operates, the control unit 200 may notify the accommodation management server 110 that the emergency button has operated. The accommodation management server 110 may take an emergency action of searching for identification information of a smart device registered by the host of the corresponding room, and transmitting a message notifying the host that the emergency button has operated using the found identification information.

FIG. 3 is a flowchart for describing a method of managing check-in and collecting environment information of an accommodation according to an embodiment of the present invention. FIG. 4 is a diagram for describing conversion between operating modes of a room device according to an embodiment of the present invention.

A user may make a reservation for a desired room by accessing a reservation page provided by the accommodation management server 110. In this case, the user may identify environment information inside of the room previously collected by the accommodation management server 110. The accommodation management server 110 may, at the time of a reservation, receive identification information through a dedicated application installed on the smart device 120 of the user and generate reservation information by associating the identification with identification information of the reserved room and manage the reservation information. The accommodation management server 110 may grant the reservation user authority to access the corresponding room from an available check-in time to a scheduled check-out time that are selected by the reservation user.

The operation mode of the room may be managed not only by the room device 101 but also by the accommodation management server 110. The room may be managed in a reservation standby mode 430 by the accommodation management server 110 before reservation, and the reserved room may be managed in a check-in standby mode 400 until the guest checks in.

In operation S30, when a reservation user goes on a trip and approaches a reserved room, the device 101 of the corresponding room may recognize the smart device of the approaching user, acquire identification information of the approaching smart device 120 through the smart device recognition unit 202, and transmit the acquired identification information to the accommodation management server 110 together with identification information of the room.

Even when a host approaches a room, the device 101 of the corresponding room may recognize the smart device of the user, acquire identification information of the approaching smart device 120 through the smart device recognition unit 202, and transmit the acquired identification information to the accommodation management server 110 together with identification information of the room.

The accommodation management server 110 searches for reservation information, room state information, and host information matching the corresponding room using the received identification information, to identify whether the user is a reservation guest or a host having access authority, generate authority information for the approaching user and transmit the generated authority information to the room device 101.

In operation S31, the authority information of the user is received from the accommodation management server 110.

In operations S32 and S36, it is determined in which mode to operate according to the received authority information. When the user is a guest who has the authority to check in to the corresponding room, it is determined that the reservation user has come to check in, and thus the process proceeds to operation S33 and operation is in a first mode 410. On the other hand, when the user has the management authority as a host of the corresponding room, the process proceeds to operation S37 and operation is in a second mode 420.

The accommodation management server 110 may search for identification information of the smart door lock 102 registered as being installed in the corresponding room and transmit a signal for instructing the smart door lock 102 to open the door. Accordingly, when the reservation user approaches the door of the room, the door may be opened automatically. The accommodation management server 110 may process the check-in of the reservation guest and notify the smart device 130 of the user registered as the host of the corresponding room of the check-in result. In addition, the smart device 120 of the guest may be provided with not only the check-in result, but also various types of information about use of the room, such as a precaution for room use set by the host, an emergency exit, and a check-out time. In addition, the smart device 120 of the guest may also be provided with tourism services and information on nearby features of the corresponding area, such as a tour guide registered by the host.

When the operation mode of the room is switched to the first mode 410, the accommodation management server 110 may randomly generate a password of the smart door lock 102, notify the smart device 120 of the guest of the password, and transmit a signal instructing to change the password to the smart door lock 102. During check-in, the guest may enter the room using the new password, and since the password of the door is automatically changed whenever the guest changes, the safety of guests may be ensured.

Operations S34 and S35 are operations in the first mode 410, in which location information of the guest is tracked to monitor the check-in state of the room, and while the guest is checked in, environment information in the room is collected (411) and the collected environment information is provided to the accommodation management server 110.

When operating in the second mode 420, the check-in standby mode 400, and the reservation standby mode 430, in which no guest is checked in, the room device 101 does not operate the sensors for measuring the indoor environment information. This is to exclude a case in which ventilation is not performed or air conditioning/heating equipment is not operated because there is no guest in the room, thereby increasing the accuracy of the indoor environment information provided to the user.

In the first mode 410, the room device 101 may enhance a security function. For example, when someone attempts to forcefully open the smart door lock 102, the room device 101 may notify the accommodation management server 110 of the attempt so that the smart device 120 of the guest and the smart device 130 of the host may be simultaneously informed of the attempt.

In response to the smart device 120 of the guest not being recognized for a predetermined time between points in time before and after a scheduled check-out time or longer during the first mode 410, a switch to a scheduled check-out state 412 is performed. The reason that check-out is not immediately processed is that guests are often preparing for check-out, such as going out to dispose of garbage, and take their cell phone with them. In response to the smart device 120 of the guest not being recognized for a certain period of time after the passage of the predetermined time, the room device 101 determines that the guest has left and performs check-out processing to switch to a reservation standby mode 430. After check-out, the room device 101 does not collect the indoor environment information anymore. As described above, when operating in any one of the second mode 420, the check-in standby mode 400, and the reservation standby mode 430 after the first mode 410, it is preferable that the room device 101 not collect the indoor environment information by continuously maintaining the sensors for measuring the environment information in a stop state. This is to provide only the environment information for when the guest is checked in, to thereby accurately provide substantial indoor environment information for when guests stay directly in a shared accommodation.

The room device 101 may notify the accommodation management server 110 of the check-out of the guest, and the accommodation management server 110 may perform check-out processes, such as deleting the check-in authority of the corresponding guest, instructing the smart door lock 102 of the room to change the password, notifying the smart device 130 of the host that the guest has checked out, and switching the corresponding room to the reservation standby mode 430.

Operation S38 is an operation in the second mode 420, in which the location information of the host is tracked to monitor a management state of the corresponding room. When it is determined that the management task of the host is completed, the accommodation management server 110 is notified that the corresponding room is available for check-in.

When a room is in the check-in standby mode 400 or the reservation standby mode 430, the accommodation management server 110 may grant management authority to a host carrying the registered smart device 130 so that the host may be allowed to access the room.

When the host having the management authority approaches the room, the room device 101 operates in the second mode 420 and does not collect the indoor environment information. The host finishes cleaning the room during operation in the second mode 420 and leaves the room, and thus in response to the smart device 130 not being recognized for a predetermined time or longer, the operation is switched to a scheduled inspection end state 421.

The reason that the inspection completion processing is not immediately performed is that hosts often perform inspection activities outside the room, such as going out to dispose of garbage and take the smart device 130 with them. In response to the smart device 130 of the host not being recognized again for a certain time after the passage of the predetermined time, the room device 101 performs the inspection completion process and switches to the check-in standby mode 400 or the reservation standby mode 430, and notifies the accommodation management server 110 of the corresponding situation. The accommodation management server 110 may recognize that the inspection of the corresponding room has been completed, and when there is a user scheduled to make a reservation for the same day, notify the smart device 120 that check-in is possible.

The embodiments of the present invention can be implemented in the form of program commands executable by a variety of computer components and may be recorded on a computer readable medium. The computer readable medium may include, alone or in combination, program commands, data files and data structures. The program commands recorded on the computer readable medium may be components specially designed for the present invention or may be usable by a person skilled in the field of computer software. Computer readable record media include magnetic media such as a hard disk, a floppy disk, or a magnetic tape, optical media such as a compact disc read only memory (CD-ROM) or a digital video disc (DVD), magneto-optical media such as floptical disks, and hardware devices such as a ROM, a random-access memory (RAM), or a flash memory specially designed to store and carry out programs. The program commands include not only a machine language code made by a compiler but also a high level code that can be used by an interpreter etc., which is executed by a computer.

Although exemplary embodiments of the present invention have been described in detail, it should be understood that various substitutions, additions, and modifications are possible without departing from the scope and spirit of the present invention, and the scope of the present invention is limited by the claims and the equivalents thereof.

The invention claimed is:

1. A system for managing check-in and collecting environment information of a shared accommodation, the system comprising:
an accommodation management server configured to manage a room reservation and check-in authority of a guest; and
a computing device comprising one or more units being configured and executed by a processor using algorithm, the algorithm which when executed, causing the processor to perform the one or more units, the one or more units comprising a smart device recognition unit, a communication unit, an environment information collecting unit, and a control unit,
wherein the smart device recognition unit having a beacon is configured to recognize a smart device of a user, acquire identification information of the smart device, transmit the acquired identification information to the accommodation management server, and operate in a first mode or a second mode according to authority information received from the accommodation management server,
wherein the environment information collecting unit includes a plurality of sensors, and each sensor is configured to measure a respective one of temperature information, humidity information, fine dust information, and chemical pollutant information of a room and a region thereof,
wherein the control unit is configured to: in response to the user being the guest having authority to check in to a corresponding room, operate in the first mode of tracking a location of the guest to monitor a check-in state of the room and collecting environment information of the corresponding room and a region thereof to transmit the collected environment information to the accommodation management server; and in response to the user being a host of a corresponding room, operate in the second mode of tracking a location of the host to monitor a management state of the corresponding room and, upon determining that a management task is completed, notifying the accommodation management server that the corresponding room is available for check-in,
wherein the computing device is configured to: in the first mode, operate each sensor to generate environment information including the respective one of temperature information, humidity information, fine dust information, and chemical pollutant information, and transmit the environment information of the corresponding room collected during operation in the first mode to the accommodation management server so that the environment information is provided to the smart device of the user through a reservation page of the corresponding room; and in the second mode, comprising (a) a check-in standby mode defining a case in which a reservation is completed and guests are waiting to check in, and (b) a reservation standby mode defining a case for before a reservation, stop operating each sensor to exclude a case in which ventilation or heating and cooling equipment is not in operation due to absence of a guest from the environment information.

2. The system of claim 1, wherein the computing device is configured to, in response to the smart device of the guest not being recognized for a predetermined time between points in time before and after a scheduled check-out time of the guest or longer, switch to a scheduled check-out state, and in response to the smart device of the guest not being recognized for the predetermined time or longer after the switching to the scheduled check-out state, switch to a check-out state and stop collecting the environment information.

3. The system of claim 2, wherein the computing device is configured to, in response to the smart device of the host being recognized in the check-out state of the guest, switch to a scheduled management task end state, and in response to the smart device of the host not being recognized for the predetermined time after the switching to the management task end scheduled state, determine that the management task is completed and transmit a message indicating the room is available for check-in to the accommodation management server.

4. The system of claim 1, wherein the computing device includes an emergency button, and is configured to, in response to the emergency button operating, notify the accommodation management server that the emergency button has operated, and the accommodation management server is configured to transmit a message indicating that the emergency button has operated to the host of the room.

5. The system of claim 1, wherein
the smart device recognition unit is provided with the beacon to recognize the smart device approaching within a predetermined distance,
the communication unit includes a network module to communicate with the accommodation management server,
the environment information collecting unit includes a plurality of sensors for measuring a respective one of temperature information, humidity information, fine dust information, and chemical pollutant information of a room and a region thereof,
the control unit is configured to, in response to the smart device of the user being recognized by the smart device recognition unit, acquire identification information of the smart device and transmit the acquired identification information to the accommodation management server, and in response to the user being a guest having authority to check in to a corresponding room, operate in the first mode of tracking the location of the guest to monitor a check-in state of the corresponding room and transmitting the environment information collected through the environment information collecting unit to the accommodation management server, and in response to the user being a host of the room, operate in the second mode of tracking the location of the host to monitor the management state of the corresponding room and, upon determining that the management task is completed, notifying the accommodation management server that the corresponding room is available for check-in, wherein the control unit is configured to, in the first mode, operate each sensor to generate the environment information including the respective one of temperature information, humidity information, fine dust information, and chemical pollutant information, and transmit the environment information of the corresponding room collected during operation in the first mode to the accommodation management server so that the environment information is provided to the smart device of the user through a reservation page of the corresponding room, and in the second mode, comprising the check-in standby mode and the reservation standby mode, stop operating each sensor to exclude a case in which ventilation or heating and cooling equipment is not in operation due to absence of the guest from the environment information.

6. A computer implemented method of managing check-in and collecting environment information of a shared accommodation, the method comprising:
   in response to recognizing, by a computing device, a smart device of a user, acquiring identification information of the smart device, and transmitting the acquired identification information to an accommodation management server;
   receiving authority information of the user from the accommodation management server; and
   in response to the user being a guest having authority to check in to a corresponding room, operating in a first mode, and in response to the user being a host of the corresponding room, operating in a second mode according to the authority information,
   wherein the computing device comprises one or more units being configured and executed by a processor using algorithm, the algorithm which is executed and causes the processor to perform the functions of the one or more units, the one or more units comprising a smart device recognition unit, a communication unit, an environment information collecting unit, and a control unit,
   wherein the smart device recognition unit having a beacon is configured to recognize the smart device of the user, acquire the identification information of the smart device, transmit the acquired identification information to the accommodation management server, and operate in the first mode or the second mode according to authority information received from the accommodation management server,
   wherein the computing device is configured to; in the first mode, operate a plurality of sensors, wherein each sensor is configured to generate environment information including a respective one of temperature information, humidity information, fine dust information, and chemical pollutant information, and transmit the environment information of the corresponding room collected during operation in the first mode to the accommodation management server so that the environment information is provided to the smart device of the user through a reservation page of the corresponding room;
   and in the second mode, comprising (a) a check-in standby mode defining a case in which a reservation is completed and guests are waiting to check in, and (b) a reservation standby mode defining a case for before a reservation, stop operating each sensor to exclude a case in which ventilation or heating and cooling equipment is not in operation due to absence of a guest from the environment information,
   wherein a user is a guest and the functions of the first mode are performed at least once, and
   wherein a user is a host and the functions of the second mode are performed at least once.

* * * * *